United States Patent Office 3,364,170
Patented Jan. 16, 1968

3,364,170
STABILIZATION OF POLYMERS WITH PHENOTHIAZINES
Christos Savides, Piscataway Township, Middlesex County, N.J., assignor to American Cyanamid Company, Stamford, Conn., a corporation of Maine
No Drawing. Filed Aug. 3, 1964, Ser. No. 387,194
7 Claims. (Cl. 260—45.8)

This invention relates to a means for stabilizing polymers against the deteriorating action of heat and air. More particularly, it relates to a process for stabilizing ABS polymers (acrylonitrile, butadiene and styrene copolymers) by incorporating therein a small amount of a phenothiazine of the Formula I:

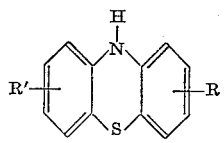

wherein R and R' are hydrogen, alkyl, alkoxy, halogen or alkylthio. The alkyl group may be 1–18 carbon atoms.

Broadly speaking, "ABS polymers" are copolymers of acrylonitrile, 1,3-butadiene and styrene. There is a description of the copolymers and methods for making them in British Plastics, December 1959, page 553, and in U.S. Patents 2,439,202 and 3,103,498. The polymers are distinguished for their tough, hard and rigid properties. They also have heat resistance, a hard surface, dimensional stability, chemical resistance and good electrical properties and are easily processed and machined. The polymers find wide application in almost all areas of industry.

ABS polymers are subject to oxidation with resultant loss of desirable physical properties. In the presence of oxygen (air) and heat, the polymers become brittle and discolored.

Various antioxidants and stabilizers have been suggested for use in ABS polymers, but these generally have not been satisfactory. Some lead to discoloration and are thus precluded for use in light-colored products. Those which do not cause discoloration have not given adequate protection. There is a distinct need for a stabilizer capable of use without causing initial discoloration of the ABS substrate. It is an object of this invention to provide such a stabilizer.

It has now been discovered that by incorporating a phenothiazine of Formula I into an ABS polymer, the rate of degradation by heat and oxygen can be greatly diminished. In other words, phenothiazines are effective stabilizers for ABS polymers. The phenothiazines of Formula I give excellent protection and do not cause initial discoloration; in fact, they prevent discoloration. Thus, this discovery affords a class of compounds which effectively stabilizes a type of polymer which up to this time has been difficult to protect.

Phenothiazines as a class have been known as antioxidants for various substrates (including polyolefins, butadiene-styrene rubbery copolymer, etc.). However, it could not be predicted that phenothiazines as defined would be so superior in ABS polymers compared with other known antioxidants.

The phenothiazines which may be used in the process of this invention include phenothiazine, 3-methylphenothiazine, 2-ethylphenothiazine, 3-ethylphenothiazine, 2-tert-butylphenothiazine, 3,7-dimethylphenothiazine, 3,7-dibutylphenothiazine, 3,7-dioctylphenothiazine, 1-methoxyphenothiazine, 2-methoxyphenothiazine, 3-methoxyphenothiazine, 4 - methoxyphenothiazine, 2 - sec-butoxyphenothiazine, 3 - octyloxyphenothiazine, 3 - dodecyloxyphenothiazine, 3-hexadecyloxyphenothiazine, 3,7-dimethoxyphenothiazine, 2,8 - dimethoxyphenothiazine, 3,7-bis-(octyloxy)phenothiazine, 3 - bromophenothiazine, 2-chlorophenothiazine, 3-chlorophenothiazine, 1-chlorophenothiazine, 4-chlorophenothiazine, 2,7-dibromophenothiazine, 2,6 - dichlorophenothiazine, 2,7 - dichlorophenothiazine, 2,8 - dichlorophenothiazine, 3,7 - dichlorophenothiazine, 4,6 - dichlorophenothiazine, 2,4 - difluorophenothiazine, 3,7-difluorophenothiazine, 2-chloro-7-fluorophenothiazine, 2 - (methylthio)phenothiazine, 3 - (methylthio)phenothiazine, 2-(isopropylthio)phenothiazine, 2-(sec-butylthio)phenothiazine, 2-(isobutylthio)phenothiazine, 2-chloro-7-methoxyphenothiazine, 6 - chloro-3-methoxyphenothiazine, 3-octyl-7-octyloxyphenothiazine, etc.

Between 0.1% and 5.0%, preferably between 0.2% and 2.0%, of the phenothiazine, based on the polymer, should be used.

The phenothiazine compound can be added to the ABS polymer latex after the polymerization is completed. It is also convenient to add the phenothiazine to the particulated polymer after the coagulation step. The stabilizer can be dry-blended in any suitable blending equipment. Other additives, such as pigments, extenders, lubricants, other stabilizers, etc., can be added and blended at the same time. The blended, stabilized polymer is then ready for milling into sheets or otherwise fabricating into articles, as by injection-molding or extruding.

The use of combinations of the phenothiazines of Formula I and other additives, such as esters of thiodipropionic acid and phenols, gives additional heat stability.

In the following examples, the parts and percentages are by weight.

Example 1

Dry ABS polymer crumb (100 parts) is dry blended with 5 parts of titanium dioxide, 1 part of zinc stearate and 0.5 part of a phenothiazine compound shown in Table I. The blended polymer is then milled on a two-roller mill into sheets of 30–40 mils thickness.

The milled polymer sheets are "aged" in a forced-draft oven at 150° C. After 6 hours in the oven, discoloration (yellowing) of the aged polymer sheets is measured by a differential colorimeter. The yellow indices (YI) of the polymer samples, before and after the aging tests, are calculated by the formula:

$$YI = \left(1 - \frac{B}{G}\right) 70$$

where B and G are blue and green reflectance readings, respectively. ΔYI, increase in the yellow index due to aging, is shown in Table I.

Samples of the polymer sheet are also removed from the oven at one-hour intervals and tested manually for brittleness. The aging time required to reach the brittle point is also shown in Table I.

TABLE I

| Antioxidants | ΔYI | Brittle Point (hours) |
|---|---|---|
| None | 24 | 1 |
| Phenothiazine | 3 | 26 |
| 2-methoxyphenothiazine | 6 | 36 |
| 3-(methylthio)phenothiazine | 5 | 40 |
| 2-chlorophenothiazine | 2 | 13 |
| 4-chlorophenothiazine | 3 | 18 |
| 3,7-dioctylphenothiazine | 10 | 7 |
| For Comparison Purposes: | | |
| N-methylphenothiazine | 23 | 2 |
| N-stearylphenothiazine | 18 | 1 |
| 2,6-di-tert-butyl-p-cresol | 21 | 3 |
| 4,4'-butylidenebis 6-tert-butyl-m-cresol | 12 | 4 |
| Dilauryl thiodipropionate | 20 | 2 |

Example 2

Unaged samples of the milled polymer sheets of Example 1 which had a brittle point greater than six hours at 150° C. were also aged in the forced-draft oven at 175° C. for 2.5 hours. The brittle point and ΔYI, determined as described in Example 1, are shown in Table II. The unstabilized polymer at 175° C. became brittle very rapidly and yellowed excessively within a short time.

TABLE II

| Antioxidants | ΔYI | Brittle Point (hours) |
|---|---|---|
| Phenothiazine | 10 | 5 |
| 3-(methylthio)phenothiazine | 8 | 7 |
| 2-methoxyphenothiazine | 6 | 10 |
| 4-chlorophenothiazine | 9 | 7 |

Example 3

The procedure of Example 1 is repeated, using 0.5 part of 4-chlorophenothiazine and 0.5 part of dilauryl thiodipropionate. After six hours in an oven at 150° C., the ΔYI of the sample is 3. The brittle point is reached in about 34 hours. These results may be compared with those shown in Table I for the individual stabilizers.

Example 4

The procedure of Example 1 is repeated, using 0.5 part of phenothiazine and 0.5 part of 2,6-di-tert-butyl-p-cresol. After six hours in an oven at 150° C., the ΔYI of the sample is 6. The brittle point is reached in about 32 hours. These results may be compared with those shown in Table I for the individual stabilizers.

I claim:

1. A composition comprising a rigid copolymer of acrylonitrile, butadiene, and styrene stabilized against the deteriorating action of heat and air by the presence of between 0.1% and 5.0% of a phenothiazine compound of the formula:

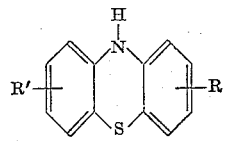

where R and R' are individually selected from the group consisting of hydrogen, alkyl of 1–18 carbons, alkoxy of 1–18 carbons, halogen and alkylthio of 1–18 carbons, and as a co-stabilizer, an ester of thiodipropionic acid.

2. A composition in accordance with claim 1 wherein the ester is dilauryl thiodipropionate.

3. The composition of claim 1 wherein the phenothiazine is 4-chlorophenothiazine.

4. The composition of claim 1 wherein the phenothiazine is the compound phenothiazine.

5. A composition comprising a rigid copolymer of acrylonitrile, butadiene, and styrene stabilized against the deteriorating action of heat and air by the presence of between 0.1% and 5.0% of a phenothiazine compound of the formula:

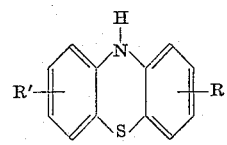

where R and R' are individually selected from the group consisting of hydrogen, alkyl of 1–18 carbons, alkoxy of 1–18 carbons, halogen and alkylthio of 1–18 carbons, and as a co-stabilizer, 2,6-dibutyl-p-cresol.

6. The composition of claim 5 wherein the phenothiazine is the compound phenothiazine.

7. The composition of claim 5 wherein the phenothiazine is 4-chlorophenothiazine.

References Cited

UNITED STATES PATENTS

| 2,605,249 | 7/1952 | Albert | 260—45.8 |
| 3,102,871 | 9/1963 | Spacht | 260—45.8 |
| 3,245,992 | 4/1966 | Dexter et al. | 260—45.8 |

DONALD E. CZAJA, *Primary Examiner.*

LEON J. BERCOVITZ, *Examiner.*

M. J. WELSH, *Assistant Examiner.*